United States Patent [19]

Caly et al.

[11] Patent Number: 5,894,031
[45] Date of Patent: Apr. 13, 1999

[54] CHOCOLATE BEVERAGE AND PROCESS FOR THE PREPARATION THEREOF

[75] Inventors: William Caly, Dublin; Richard Derek Gullo, Marysville; Soledad N. Palag, Hillard, all of Ohio; Marcel Rosse, Sauges, Switzerland

[73] Assignee: Nestec S.A., Vevey, Switzerland

[21] Appl. No.: 08/725,428

[22] Filed: Oct. 3, 1996

[51] Int. Cl.$^6$ .................................. A23G 1/00; A23L 2/00
[52] U.S. Cl. .................... 426/593; 426/330.3; 426/334; 426/564; 426/569; 426/591; 426/593; 426/660
[58] Field of Search .................. 425/330.3, 334, 425/564, 569, 591, 593, 660

[56] References Cited

FOREIGN PATENT DOCUMENTS 0015664 of 1912 United Kingdom .................. 426/593

OTHER PUBLICATIONS

Gillette, F.L. 1929, The White House Cook Book, Saalfield Publishing Co., Akron, Ohio, p. 494.

Primary Examiner—Helen Pratt
Attorney, Agent, or Firm—Pennie & Edmonds LLP

[57] ABSTRACT

A beverage mix comprising at least about 40% by weight based on the total weight of the beverage mix of chocolate or compound confectionery pieces whose thickness is from about 0.25 to 0.75 mm together with a powdered cocoa mix or powdered creamer.

13 Claims, No Drawings

CHOCOLATE BEVERAGE AND PROCESS FOR THE PREPARATION THEREOF

TECHNICAL FIELD

The present invention relates to a chocolate beverage mix and more particularly to a hot chocolate beverage mix containing real chocolate or compound confectionery.

BACKGROUND ART

Typically, hot cocoa beverage mixes are sold as powders which are mixed into hot water or milk to give the beverage for consumption. The main ingredient of the powder is sugar and, when mixed into hot water or milk, most of the powder is water soluble and dissolves while the remainder of the powder forms a suspension to provide flavour and texture.

There is a desire for beverage mixes, which are to be mixed into hot water or milk for consumption, which contain real chocolate or compound confectionery. Beverage mixes are known in the form of syrups or as powders in which cocoa powder is mixed with a beverage powder such as cocoa but these products suffer from the disadvantage that the presence of real chocolate is not evident before dissolution. Normally, when fat based confectionery is dispersed into hot water or milk, the fat components melt, separate and rise to the surface of the beverage. Only one chocolate beverage mix is marketed in a non-powder or non-syrup form, this being CHOCOLAT CHARBONNEL sold in the UK which contains formed chocolate flakes. However, this product suffers from the following disadvantages:

1) When mixed into hot water or milk for consumption, the solubility is less than desirable causing
    a) the formation of lumps in the beverage, and
    b) the appearance of visible oil on the top.
2) The beverage has little foam, body or creaminess, and
3) The flakes do not have the appearance of real chocolate.

SUMMARY OF THE INVENTION

Surprisingly, we have found that by using thin pieces of the chocolate or compound confectionery material, the following advantages may be achieved:

1) The visual appeal of the beverage mix is improved whereby the presence of real chocolate or compound confectionery is self-evident before mixing into hot water or milk for consumption,
2) When mixed into hot water or milk for consumption, the particles melt and separate quickly the solubility is improved so that the beverage appears homogeneous within a few seconds as a result of which
    a) the formation of lumps in the beverage is prevented or reduced so that the beverage appears homogeneous within a few seconds, and
    b) the appearance of visible oil on top of the beverage is prevented or reduced.
3) The beverage prepared for consumption exhibits foam which would conceal any visible oil that may be present.

Accordingly, the present invention provides a beverage mix comprising at least about 40% by weight based on the total weight of the beverage mix of chocolate or compound confectionery pieces whose thickness is from about 0.25 to 0.75 mm together with a powdered cocoa mix or powdered creamer.

DETAILED DESCRIPTION OF THE PREFERRED EMBODIMENTS

The chocolate or compound confectionery pieces are advantageously in the form of gratings, shavings, cuttings or crumbles and the thickness (as measured on the smallest axis of the particle) is preferably from about 0.3 to 0.6 mm and more preferably from about 0.35 to 0.55 mm. The length of the pieces may be, for example, from 0.1 to 2 cm and preferably from 0.5 to 1.5 cm. The width of the pieces may be, for example, from about 0.1 to 1.0 cm and preferably from 0.25 to 0.75 cm. The pieces may, if desired, be curled or folded. The amount of chocolate or compound confectionery pieces in the beverage mix is preferably from about 60 to 95% and more preferably from 70 to 90% by weight based on the total weight of the beverage mix.

The chocolate component may be milk chocolate, dark chocolate or semisweet chocolate. The compound confectionery may be a material other than chocolate derived from milk and sugar, containing fat as the continuous phase, for example vegetable fats or various substitutes such as direct cocoa butter replacements, stearines, coconut oil, palm oil, butter or any mixture thereof. If desired, the chocolate or compound confectionery may contain a part of the creamer or cocoa powder mixed into the chocolate or compound confectionery during tempering.

The amount of powdered cocoa mix or powdered creamer is preferably from about 5 to 50% and more preferably from 10 to 30% by weight based on the total weight of the beverage mix. The powdered cocoa mix or powdered creamer supplies foam and creaminess to the formed beverage. The creamer may also improve the solubility and supply body and colour to the formed beverage. The creamer may be, for instance, a non-dairy creamer such as COFFEE MATE. Preferably, the amount of saccharose in the beverage mix is from about 20 to 55% by weight based on the weight of the beverage mix and, if desired, saccharose may be added to ensure that it is present in such an amount.

If desired, other ingredients such as those conventionally used in beverage mixes may be incorporated into the beverage mix, e.g. gums, thickeners, milk powder such as skimmed milk powder, whey, sweeteners, flavors, emulsifiers and/or colours. The addition of whey may improve the solubility and enhance the chocolate flavour. These other ingredients may be employed in conventional amounts, e.g. the amount of milk powders may be from about 10–15%, and the amount of emulsifiers and gums may each be from about 0.05 to 1.0% by weight based on the total weight of the beverage mix.

In addition, gas may be used to improve the dispersibility or to produce a foam which would hide any small amount of fat on the finished product. The gas may be introduced either
    a) by adding a suitable gas such as nitrogen or carbon dioxide, or
    b) by adding a gas releasing agent such as an alkali metal carbonate or bicarbonate, e.g. the sodium or potassium salt, under acid conditions which may be provided by a food grade acidulant, e.g. citric acid, gluconolactone or food grade salts thereof.

The present invention also provides a process for preparing a beverage mix which comprises mixing chocolate or compound confectionery pieces whose thickness is from about 0.25 to 0.75 mm with a powdered cocoa mix or powdered creamer in a mixer that provides gentle mixing in order not to break up the chocolate or compound confectionery pieces into powder.

The chocolate or compound confectionery pieces whose thickness is from about 0.25 to 0.75 mm may be obtained by grating or slicing a larger solid piece of the chocolate or compound confectionery using a grating or slicing machine.

When other ingredients are present in the beverage mix such as gums, thickeners, milk powders, sweeteners, flavors, emulsifiers and/or colours, these other ingredients may conveniently be added to the powdered cocoa mix or powdered creamer before mixing with the chocolate or compound confectionery pieces. When a gas or a gas releasing agent is added, it may be introduced in the following ways:

1) by mixing either the gas or a gas releasing agent with the creamer and adding to the grated chocolate so that the grated chocolate contains creamer with gas on the surface,
2) adding either the gas or a gas releasing agent with the creamer to the chocolate which is then grated so that the grated chocolate contains the creamer and gas within, or
3) adding the gas to molten chocolate during chocolate manufacture.

The present invention also provides a process for preparing a beverage which comprises adding a beverage mix to and mixing it with a consumable hot liquid wherein the beverage mix comprises at least about 50% by weight based on the total weight of the beverage mix of chocolate or compound confectionery pieces whose thickness is from about 0.25 to 0.75 mm together with a powdered cocoa mix or powdered creamer.

The consumable liquid is typically hot water or hot milk. The amount of beverage mix in the consumable liquid may vary according to desired tastes but is typically from about 10 to 40% and preferably from 20 to 30% by weight based on the total amount of the beverage.

An alternative method of preparing the beverage is to add the beverage mix to cold consumable liquid and then heating in a microwave oven, e.g. at full power for from about 1–2 minutes.

EXAMPLE

The following Examples further illustrate the present invention.

Example 1

1 kg of dark chocolate is processed batchwise in an ARTIFEX grater (manufactured by Aesch Gach Aaran, Switzerland) having a rotating disc provided with thin "U-shaped" grooves. The chocolate is pressed against the disc with pressure by the operator on the head of the cylinder whereby the "U-shaped" grooves slice the chocolate into pieces of 1 cm×0.25 cm×0.5 mm.

90 parts of the sliced chocolate pieces are mixed gently in a mixer with 10 parts of a powdered creamer to form the beverage mix in which the presence of real chocolate is readily apparent.

A beverage, prepared by adding 10 parts of the above beverage mix to 100 parts of hot milk and mixing, was substantially free of lumps, more foamy and less visible oil was present on top when compared with a beverage prepared from CHOCOLAT CHARBONNEL.

Example 2

Chunks of milk chocolate roughly 5 cm in each dimension are grated in an URSHEL slicer/grater (manufactured by Urschel Labs, Valparaiso, Ind., USA) into chocolate shavings. The chunks are placed in a spinning basket in the grater and are pressed into the blades by means of centrifugal force. The thickness of the shavings is determined by setting a gap between the blades and the wall of the blade housing. Depending on the angle at which the blade meets the chocolate, the particles can curl or fold and, in such cases, the thickness is that of the shavings uncurled or unfolded. The shavings have dimensions of 0.5 cm×0.25 cm×0.4 mm.

80 parts of the shaved chocolate pieces are mixed gently in a mixer with 20 parts of a powdered cocoa mix to form the beverage mix in which the presence of real chocolate is readily apparent.

A beverage, prepared by adding 10 parts of the above beverage mix to 100 parts of hot milk and mixing, was substantially free of lumps and less visible oil was present on top when compared with a beverage prepared from CHOCOLAT CHARBONNEL.

What is claimed is:

1. A beverage mix consisting essentially of at least about 40% by weight based on the total weight of the beverage mix of chocolate or compound confectionery pieces having a thickness from about 0.25 to 0.75 mm, a length from about 0.1 cm to 2 cm, and a width from about 0.1 cm to 1 cm, together with a powdered cocoa mix or powdered creamer and optionally a gum, thickener, milk powder, whey, sweetener, flavor, emulsifier, color, or a mixture thereof, wherein said beverage mix is capable of providing a visibly homogeneous beverage.

2. A beverage mix according to claim 1 wherein the chocolate or compound confectionery pieces are in the form of gratings, shavings, cuttings or crumbles.

3. A beverage mix according to claim 1 wherein the pieces are curled or folded.

4. A beverage mix according to claim 1 wherein the chocolate component may be milk chocolate, dark chocolate or semisweet chocolate.

5. A beverage mix according to claim 1 wherein the compound confectionery is a material other than chocolate derived from milk and sugar, containing fat as the continuous phase.

6. A beverage mix according to claim 1 wherein the chocolate or compound confectionery may contain a part of the creamer or cocoa powder mixed into the chocolate or compound confectionery during tempering.

7. The beverage mix of claim 1 wherein the powdered cocoa mix or powdered creamer is present in an amount from 5 to 50 percent by weight of the beverage mix.

8. A process of preparing a beverage mix which consists essentially of mixing chocolate or compound confectionery pieces present in at least 40% by weight based on the total weight of the beverage mix and each having a thickness from about 0.25 to 0.75 mm, a length from about 0.1 cm to 2 cm, and a width from about 0.1 cm to 1 cm, with a powdered cocoa mix or powdered creamer in a mixer that provides gentle mixing to inhibit reduction of the chocolate or compound confectionery pieces into powder to from the beverage mix of claim 1.

9. A process of preparing a beverage mix according to claim 8 wherein the chocolate or compound confectionery pieces are prepared by grating or slicing a larger solid piece of the chocolate or compound confectionery using a grating or slicing machine.

10. A process for preparing a beverage comprising adding a beverage mix to and gently mixing it with a consumable hot liquid wherein the beverage mix consists essentially of at least about 40% by weight based on the total weight of the beverage mix of chocolate or compound confectionery pieces whose thickness is from about 0.25 to 0.75 mm, a length from about 0.1 cm to 2 cm, and a width from about 0.1 cm to 1 cm, together with a powdered cocoa mix or powdered creamer.

11. The process of claim 10, wherein the beverage mix is added to and mixed with the consumable hot liquid to form a visibly homogeneous beverage in no more than a few seconds.

12. A process for preparing a beverage comprising adding a beverage mix to and gently mixing it with a cold consumable liquid and then heating in a microwave oven wherein the beverage mix consists essentially of at least about 40% by weight based on the total weight of the beverage mix of chocolate or compound confectionery pieces whose thickness is from about 0.25 to 0.75 mm, a length from about 0.1 cm to 2 cm, and a width from about 0.1 cm to 1 cm, together with a powdered cocoa mix or powdered creamer.

13. The process of claim 12, wherein the beverage mix is added to and mixed with the consumable hot liquid to form a visibly homogeneous beverage in no more than a few seconds.

* * * * *